Figure 3:
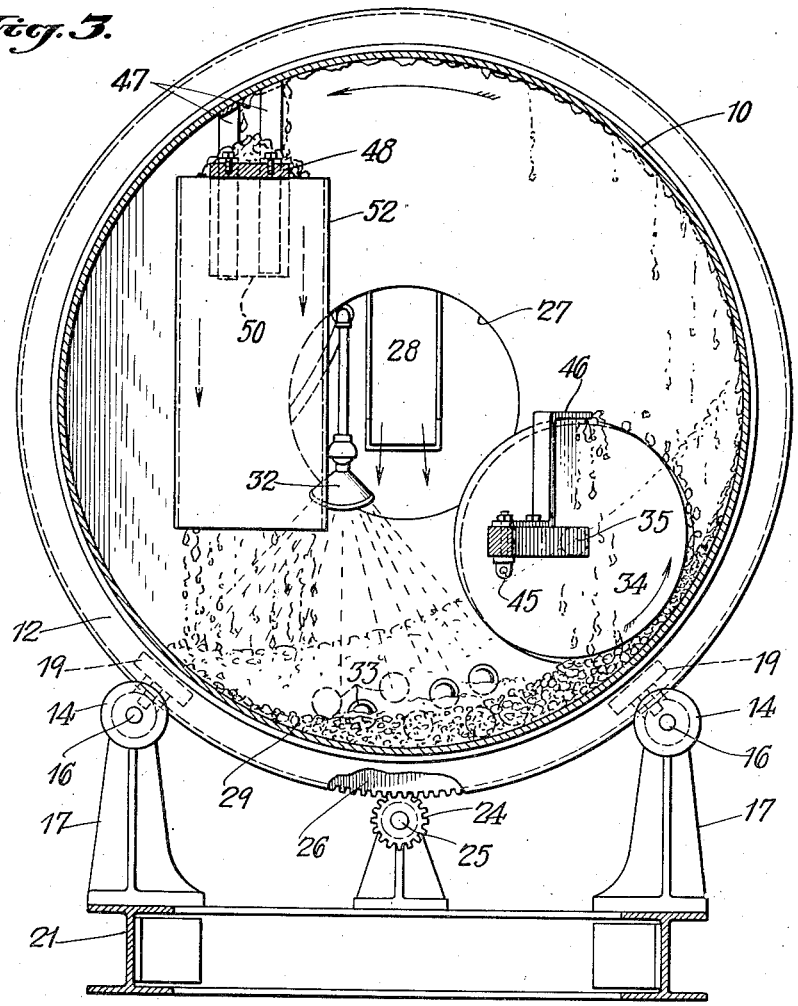

Aug. 18, 1942.                T. E. LLOYD                 2,293,439
             APPARATUS FOR MAKING NODULES OR PELLETS
                  Filed June 7, 1941           2 Sheets-Sheet 1
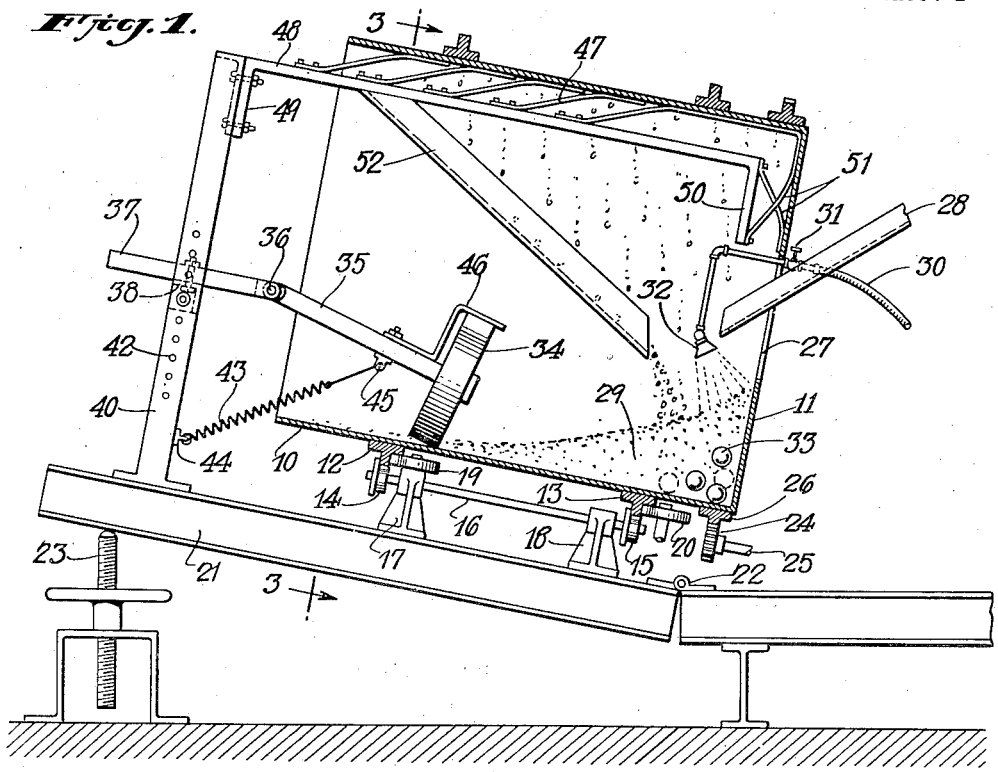
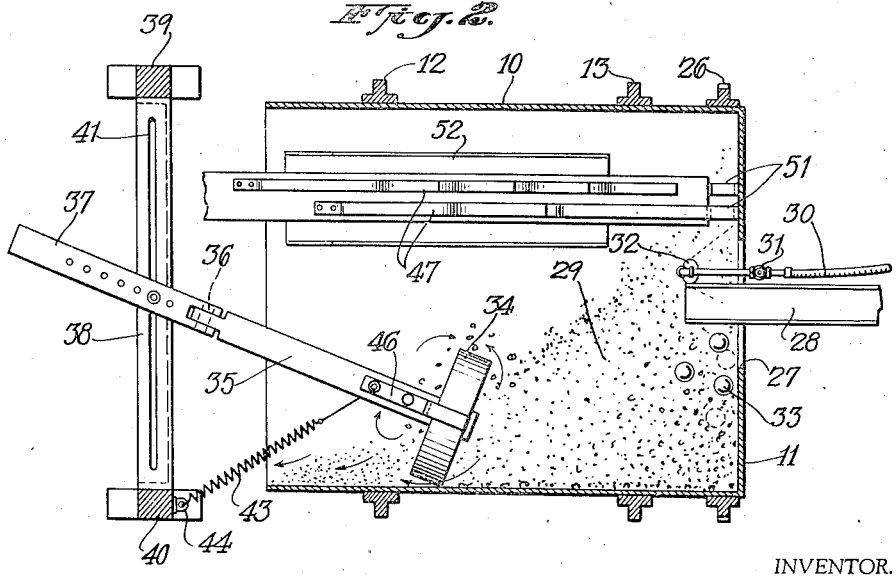
INVENTOR.
Thorne E. Lloyd.
BY
Benj. T. Rauber ATTORNEY Aug. 18, 1942.    T. E. LLOYD    2,293,439
APPARATUS FOR MAKING NODULES OR PELLETS
Filed June 7, 1941    2 Sheets-Sheet 2

INVENTOR.
THORNE E. LLOYD.
BY
Benj. T. Rauber ATTORNEY

Patented Aug. 18, 1942

2,293,439

UNITED STATES PATENT OFFICE 2,293,439

APPARATUS FOR MAKING NODULES OR PELLETS

Thorne E. Lloyd, Bear Pond, N. J., assignor to Dwight & Lloyd Sintering Company, Inc., New York, N. Y., a corporation of Delaware Application June 7, 1941, Serial No. 396,971

18 Claims. (Cl. 18—1)

My invention relates to apparatus for making pellets or small rounded masses of finely divided material such as ores, ore concentrates, cement mixes, calcareous marls and other material of similar nature for treatment in furnaces such as sintering machines.

In order to produce nodules or pellets of the above materials having the proper physical characteristics required to hold their shape during metallurgical treatment as, for example, on a sintering bed until they have become sintered, it is necessary that the raw material, such as the finely divided concentrate or mix has just the right moisture content, that is, that it is neither too wet nor too dry and that the moisture is uniformly distributed throughout the material and that thereupon the material be broken up into aggregates of suitable size and compacted into pellets or nodules.

In sintering such pellets it is generally desirable not only to have them of sufficient compactness and uniformity but also that they be of a size best suited for the particular sintering operation to which they are to be subjected. The size of the pellets depends upon a number of factors which may vary or be varied independently of each other.

My present invention provides an apparatus whereby very finely divided material, such as material finer than 100 mesh, may be moistened uniformly and molded into nodules or pellets of the proper consistency and size.

The pellets may be formed by the apparatus of my invention with each nodule or pellet having a uniform moisture content throughout and with a smooth or "troweled" surface. Also in my apparatus the various conditions that control the size of the pellets may be adjusted or controlled to produce pellets of a desired size, or to maintain the pellets within a desired limit of sizes.

In my invention the finely divided material to be formed into pellets or nodules is introduced into a rotating mixing element, such as a cylinder or drum, rotating with its axis inclined to the horizontal so as to form an accumulation at the lower of the inclined ends, this end being closed by an end plate. A fine spray of water is played onto this accumulation of finely divided material so as to wet the surface and as the cylinder rotates to cause the moistened particles of material to roll up into small balls which thereupon rotate or move toward the upper end of the drum or cylinder.

The interior of the small balls is generally thoroughly moistened or may have an excess of moisture while the outer or surface part to which the dry pulverized material adheres has a much smaller or deficient moisture content. As these small balls or agglomerations of material pass toward the upper end of the cylinder which is preferably open, they may come beneath a roller which rests or bears downwardly onto the inner surface of the cylinder and rotates with it so as to crush the agglomerations and spread them between the roller and the wall of the cylinder. In so doing the water is forced uniformly through the material and it becomes uniformly moistened. As the cylinder and roller rotate this material is scraped free from the surface of the cylinder and falls back into the mass of material in a uniformly moistened condition. Due to the further rotation of the cylinder, and accordingly of the material thus returned, it again is formed into pellets which roll toward the open end of the cylinder. Owing to the different characteristics of the pellets thus formed they pass about the roller and are discharged from the open end of the cylinder.

The cylinder may be tilted to different angles and the roller may be positioned at different places in the cylinder or pressed with adjustable force acting, with the speed of the cylinder, the rate of feed and the supply of moistening material, to control the size of the pellets or to bring them within a predetermined limit of size.

The various features of my invention are illustrated, by way of example, in the accompanying drawings in which Fig. 1 is a vertical section of an apparatus embodying my invention. Fig. 2 is a horizontal section taken through the axis of the rotating cylinder and Fig. 3 is a view on a larger scale taken from the left of Figs. 1 and 2.

In the embodiment of the invention shown in the accompanying drawings a cylinder 10 closed at one end, the inlet or feed end, by an end plate 11 is rotatably mounted in a position slightly inclined upwardly from the inlet end. The cylinder may be mounted in any suitable manner as, for example, by being provided with a pair of circular tracks 12 and 13 which rest upon pairs of trunnions 14 and 15 respectively, which are in turn mounted on shafts 16 carried on brackets or supports 17 and 18. Each of the supports 17 and 18 is also provided with a thrust roller 19, 20 to support the cylinder against endwise movement when tilted. The supports 17 and 18 are mounted on a platform 21 hinged as at 22 to permit it to be tilted to any desired angle by means of a screw or jack 23. The cylinder may be rotated by any suitable means as, for example, by a pinion 24 mounted on a driven shaft 25 and meshing with a gear ring 26 encircling the cylinder or drum 10.

The end plate 11 is provided with an opening 27 through which a feed spout 28 projects to permit finely divided material to be supplied to the inlet or feed end of the drum or cylinder. The material thus supplied collects in the lowermost part of the cylinder as at 29. As the cylinder rotates this material is carried upwardly on the inner surface of the cylinder until it reaches a point at which the upper part of the accumulation rolls back to the lower part of the bed of material thus keeping the material in constant movement or agitation.

Water or other moistening liquid is supplied through a supply pipe 30 and control valve 31 through the opening 27 and thence to a spray nozzle 32 which directs a fine spray of the moistening fluid onto the surface of the bed of material 29. The fine spray of water or moistening liquid thoroughly wets the surface of the bed of material 29 and as the surface is carried up by the rotating cylinder wall and falls back it agglomerates and collects a surface layer of drier material, that is, the drier material adheres to the surface of the moistened masses of material. Consequently, the moisture content varies from the outer dry surface to the thoroughly or overly moistened interior. The agitation of the material thus continues with the rotation of the cylinder. To break up accumulations or masses of moistened material in the lower part of the bed 29 balls 33 of metal or other heavy material may be placed in the drum or cylinder. When a bed of material 29 has thus been accumulated and moistened, the feed of material through the supply chute or spout 28 is continued building up the bed 29 to such an extent that it extends to the opposite open end of the drum and then overflows therethrough.

The rolling or tumbling of the partly moistened material tends to form it into rounded masses or balls or pellets. Some of these balls or pellets may, however, be formed of material having an overly moistened interior and a dry surface, which when subjected to a baking or sintering operation might cause the pellets to break up or disintegrate materially or otherwise deteriorate. Moreover they may be of an undesirable size.

To break up such aggregation or balls of material and to bring them to the proper size and moisture content a crushing roller 34 is mounted on the inner surface of the drum at a short distance below the upper open end of the drum or cylinder and in such a position that as it rests against the inner surface of the drum or cylinder it is rotated by contact with the latter. The cylinder and crushing roller may be rotated in either direction depending upon the position of the roller in the cylinder.

In the position shown in Fig. 2 the cylinder and roller would rotate counter-clockwise when viewed from the left of the cylinder. In Fig. 1 the roller is represented as resting on the lowermost surface of the cylinder or drum. While in Figs. 2 and 3 it is shown as bearing against that part of the cylinder that is rotating upwardly and carrying with it the moistened material being treated.

The crushing roller 34 is rotatably mounted on an arm hinged at 35 to a fixed arm 37 so as to permit the roller to move up and down. The arm 37 is in turn supported on a cross-beam 38 carried by a pair of spaced uprights 39 and 40. The cross-beam 38 is slotted as at 41 and the arm 37 is bolted to the cross-beam 38 through the slot 41 so that its position may be adjusted transversely of the drum or cylinder. In this way the angle of the roller 34 to the surface of the drum or cylinder may be adjusted. The cross-beam 38 may be secured in any of a number of holes 42 in the uprights 39 and 40 to adjust its height relative to the cylinder or drum 10.

The crushing roller 34 bears against the inner surface of the drum 10 by its own weight and also, if desired, by the tension of a spring 43 secured to a bracket 44 on the upright 40 and a bracket 45 on the swinging arm 35. Material that adheres to the surface of the crushing roller 34 may be scraped free by a scraper 46.

As the drum and crushing roller rotate large irregular accumulations of moistened material with adhering surfaces of drier material are brought against the face of the roller 34 and thence between the roller and the inner surface of the cylinder where they are crushed and spread about the surface of the drum thereby squeezing and distributing the moisture uniformly through the mass of material between the crushing roller and the drum.

This material is then carried by the rotation of the drum upwardly until it is brought into contact with scrapers 47 mounted on a bar 48 secured as at 49 to the uprights 39 and 40 and projecting into the cylinder or drum to approximately its opposite end, being bent downwardly somewhat short of the end plate 11 as at 50. The inturned part 50 may also be provided with scrapers 51 to remove accumulations of material from the inner surface of the end plate 11. The material thus scraped from the inner surface of the drum, and which has been brought to uniform moisture by the crushing roller 34, drops onto an inclined chute 52 which directs it back toward the inlet end of the cylinder or drum.

Here the rotating or tumbling action of the drum forms it into pellets of uniform moisture throughout. Thereupon the pellets roll toward the opposite or upper open end of the cylinder to be discharged. Preferably the material from the chute 52 is discharged somewhat short of the spray 32 so as not to be again saturated with moisture.

As these pellets roll toward the crushing roller they roll past the roller end and to the right of it, looking at the apparatus from the left of Figs. 1 and 2. Those pellets or nodules which are oversized, however, fall downwardly and underneath the roller, or if they have passed to the right, they fall downwardly and back in the roller where they are crushed against the side of the cylinder. Very fine nodules or pellets never pass the crusher.

Accordingly, the crushing roller permits those pellets or nodules to pass which are of a certain size, while intercepting oversize or undersize agglomerations and crushing them whereby their moisture content is uniformly distributed and returns this crushed material as flakes ready to be formed into pellets. By bringing the pellets to uniform moisture content and then tumbling or rolling in contact with each other their surfaces are made very smooth and uniform and have a uniformly rounded shape and "troweled" surface.

The size of the pellets that may pass the roller is governed by a number of factors among which are the speed of the rotating cylinder, which may be controlled by the speed of the driving pinion 24; the rate of feed through the chute 28; the pressure of the crushing roll 34, which may be controlled by the tension of the spring 43; the angle of the crushing roll 34 to the axis of the cylinder or drum 10, which may be adjusted by moving the arm 37 transversely on the crossbeam 38, or to some extent by the height of the cross-beam 38; by the amount of moisture supplied through the regulating valve 31, or by adjusting the angle of the cylinder 1 by means of the jack 23. The greater the angle of the crushing roller 34 to the axis of the cylinder, the greater is its resistance to rolling and the more the crushing of oversized pellets is accomplished by a smoothing action which spreads the agglomerations of material and distributes their moisture content.

When a greater variation in the size of the nodules is permissible, the output can be increased by increasing the moisture and speed of the rotation of the cylinder. A slight increase of feed without additional moisture will make the nodules smaller and necessarily of less moisture content. Should the charge have lumps in it not easily broken, this may be overcome by increasing the angle of the crushing roll and the tension of the spring 43.

The apparatus will speedily mix any material even though it is not to be formed into nodules or pellets and will break up and grind lumps in this material which are larger than the size at which the machine is set to discharge. Tougher material, such as scrap iron, may remain in the mixer indefinitely.

Through the above invention I provide an apparatus in which finely divided material may be readily moistened and formed into nodules or pellets of controlled size and of uniform moisture content. The pellets or nodules are thereby rendered compact and smooth and may be subjected to heat and handling without disintegrating.

It will be understood that the cylinder or drum 10 need not be of an exact cylindrical shape but may be slightly frusto-conical or may diverge from straight lengthwise elements of rotation.

What I claim is:

1. Apparatus for making pellets which comprises a rotating drum closed inwardly from its periphery for a limited distance to provide a feed opening, means for rotatably mounting said drum with its lower inner surface inclined upwardly from said feed end, means to supply material to be made into pellets at said feed end, means to supply moisture to the material supplied at said feed end and means contacting the inner inclined surface of said drum intermediate of the ends of said inclined surface to crush oversize particles against the inner surface of said drum said contact means being spaced from the lower inlet end of said drum to form a space for moistening and working material and being spaced from the upper end of said drum to form a space for rolling moistened material into pellets after passing upwardly past said contacting means.

2. Apparatus for making pellets which comprises a rotating drum closed inwardly from its periphery for a limited distance to provide a feed opening, means for rotatably mounting said drum with its lower inner surface inclined upwardly from said feed end, means to supply material to be made into pellets at said feed end, means to supply moisture to the material supplied at said feed end, means contacting the inner inclined surface of said drum intermediate of the ends of said inclined surface to crush oversize particles against the inner surface of said drum and means to remove material adhering to the inner surface of said drum said contact means being spaced from the lower inlet end of said drum to form a space for moistening and working material and being spaced from the upper end of said drum to form a space for rolling moistened material into pellets after passing upwardly past said contacting means.

3. Apparatus for making pellets which comprises a rotating drum closed inwardly from its periphery for a limited distance to provide a feed opening, means for rotatably mounting said drum with its lower inner surface inclined upwardly from said feed end, means to supply material to be made into pellets at said feed end and means to supply moisture to the material supplied at said feed end and rotating crushing means contacting the inner surface of said drum at a distance from said feed end to crush oversize particles against the inner surface of said drum said rotating and chushing means being spaced from the lower end of said drum to form a space for moistening and working material and spaced from the upper end of said drum to form a space for rolling material into pellets.

4. The apparatus of claim 3 in which said rotating crushing means is a rotatable roller.

5. Apparatus for making pellets which comprises a rotating drum, means for rotatably mounting said drum to provide an inclined lower surface to support the material to be formed into pellets, means for supplying material and moistening liquid at the lower end of said drum in sufficient quantity to cause said material to overflow to the upper part of said drum and a crushing roller bearing against the inner surface of said drum in the path of overflow of said material to crush oversize moistened material and smooth it against the surface of said drum and of a width sufficiently less than the length of said drum to provide a feeding space at the lower end and an overflow space at the upper end of said drum.

6. Apparatus for making pellets which comprises a rotating drum, means for rotatably mounting said drum to provide an inclined lower surface to support the material to be formed into pellets, means for supplying material and moistening liquid at the lower end of said drum in sufficient quantity to cause said material to overflow to the upper part of said drum, a crushing roller in the path of overflow of said material to crush oversize moistened material and smooth it against the surface of said drum and of a width sufficiently less than the length of said drum to provide a feeding space at the lower end and an overflow space at the upper end of said drum and means positioned above said roller to remove moistened material adhering to said surface.

7. Apparatus for making pellets which comprises a rotating drum, means for rotatably mounting said drum to provide an inclined lower surface to support the material to be formed into pellets, means for supplying material and moistening liquid at the lower end of said drum in sufficient quantity to cause said material to overflow to the upper part of said drum, a crushing roller in the path of overflow of said material to crush oversize moistened material and smooth it against the surface of said drum and of a width sufficiently less than the length of said drum to provide a feeding space at the lower end and an overflow space at the upper end of said drum, a scraper contacting the inner surface of said drum at a position above said roller to remove moistened material adhering thereto and means for deflecting the material thus scraped from said surface of said drum toward the feed end thereof.

8. The apparatus of claim 5 having means for adjusting the position of said roller and its pressure against the inner surface of said drum.

9. The apparatus of claim 5 and a supporting arm for said roller comprising an arm adjustable sidewise of said drum and to fixed angular position relative thereto and an arm carrying said roller and hinged to swing in a vertical plane.

10. Apparatus for making pellets which comprises a rotating drum, means for mounting said drum with its axis of rotation at an angle to the horizontal, an end wall at the lower end of said drum, means for feeding material through said end wall into said drum, a liquid spray pipe in said feed end of said drum, a crushing roller mounted in said drum at a distance from said closed end and in a position to rotate on the inner surface of said drum, said crushing roller being spaced from the lower end of said drum to form a space for moistening and working material and being spaced from the upper end of said drum to form a space for rolling material into pellets, a scraper to remove material adhering to the surface of said roller, scrapers to scrape material from the inner surface and end wall of said drum, and means to direct the material scraped from the inner surface of said drum toward the closed end of said drum.

11. The apparatus of claim 10 and means to vary the inclination of said drum to the horizontal.

12. The apparatus of claim 10 and means to vary the position of said roller in said drum and its pressure against the surface of said drum.

13. Apparatus for making pellets which comprises a rotating drum, means for mounting said drum with its axis of rotation inclined to the horizontal, an end wall at the lower feed end of said drum having an inlet opening, a feed chute extending into said drum through said opening, a liquid spray pipe in the inlet end of said drum, a crushing roller mounted in said drum at a distance from said inlet end and in a position to rotate on the inner surface of said drum, said crushing roller being spaced from the lower end of said drum to form a space for moistening and working material and being spaced from the upper end of said drum to form a space for rolling material into pellets, a supporting arm for said arm mounted to swing on a vertical axis and adjustable transversely in said drum, means to press said roller against the surface of said drum, means comprising a jack to vary the inclination of said drum to the horizontal, a scraper to remove material adhering to said roller, a scraper above said roller to scrape material from the inner surface of said drum and said end wall.

14. Apparatus for making pellets which comprises a drum rotatable on its longitudinal axis and having its inner surface inclined upwardly in its lower path of travel from a feed end toward a discharge end, and a roller rotatably mounted within said drum to bear against the inner surface of said drum on a limited zone between the feed and discharge ends of said drum, said crushing roller being spaced from the lower end of said drum to form a space for moistening and working material and being spaced from the upper end of said drum to form a space for rolling material into pellets.

15. Apparatus for making pellets which comprises a drum rotatable on its longitudinal axis and having its inner surface inclined upwardly in its lower path of travel from a feed end toward a discharge end, and a roller rotatably mounted within said drum to bear against the inner surface of said drum on a limited zone between the feed and discharge ends of said drum, said roller having its surface inclined to the inner surface of said drum at its contact therewith.

16. Apparatus for making pellets which comprises a drum rotatable on its longitudinal axis and having its inner surface inclined upwardly in its lower path of travel from a feed end toward a discharge end, and a roller rotatably mounted within said drum to bear against the inner surface of said drum on a limited zone between the feed and discharge ends of said drum, and a scraper on said roller, said roller being so inclined that material scraped from said roller falls toward the feed end.

17. Apparatus for making pellets which comprises a drum rotatable on its longitudinal axis and having its inner surface inclined upwardly in its lower path of travel from a feed end toward a discharge end, and a roller rotatably mounted within said drum to bear against the inner surface of said drum on a limited zone between the feed and discharge ends of said drum, and means for adjusting the angle and the pressure of contact of said roller against the surface of said drum.

18. Apparatus for making pellets which comprises a drum rotatable on its longitudinal axis and having its inner surface inclined upwardly in its lower path of travel from a feed end toward a discharge end, and a roller rotatably mounted within said drum to bear against the inner surface of said drum on a limited zone between the feed and discharge ends of said drum, said roller surface being inclined to said drum surface at its contact therewith and contacting with said drum surface above the lowermost point of rotation of said drum surface.

THORNE E. LLOYD.